(12) United States Patent
Kim

(10) Patent No.: US 8,376,128 B2
(45) Date of Patent: Feb. 19, 2013

(54) ROLLER FOR BELT CONVEYER

(76) Inventor: Woo-Jin Kim, Gwangyang-si (KR)

( * ) Notice: Subject to any disclaimer, the term of this patent is extended or adjusted under 35 U.S.C. 154(b) by 0 days.

(21) Appl. No.: 13/075,750

(22) Filed: Mar. 30, 2011

(65) Prior Publication Data

US 2011/0240444 A1 Oct. 6, 2011

(30) Foreign Application Priority Data

Apr. 1, 2010 (KR) ........................ 10-2010-0029955

(51) Int. Cl.
*B65G 15/08* (2006.01)
(52) U.S. Cl. ............................ 198/827; 198/830; 193/37
(58) Field of Classification Search .................. 198/818, 198/823, 824, 825, 826, 827, 828, 829, 830; 193/37
See application file for complete search history.

(56) References Cited

U.S. PATENT DOCUMENTS

| | | | | |
|---|---|---|---|---|
| 3,219,175 | A * | 11/1965 | Watt ............................... | 198/827 |
| 3,888,131 | A * | 6/1975 | Reid ............................... | 198/843 |
| 4,196,805 | A * | 4/1980 | Banno ............................ | 198/827 |
| 4,787,504 | A * | 11/1988 | Schultz .......................... | 198/782 |
| 4,919,253 | A * | 4/1990 | Morrison ....................... | 198/830 |
| 6,516,942 | B2 * | 2/2003 | East ............................... | 198/830 |
| 7,287,642 | B1 * | 10/2007 | Carr et al. ................... | 198/861.1 |
| 8,025,145 | B2 * | 9/2011 | Keys ............................. | 198/825 |

\* cited by examiner

*Primary Examiner* — James R Bidwell
(74) *Attorney, Agent, or Firm* — Kile Park Goekjian Reed & McManus PLLC

(57) ABSTRACT

A roller for a belt conveyer. A roller tube has an engraved groove for indicating the degree to which the surface of the roller is abraded. A shaft reinforcement member is provided in one end of the roller tube, connected to a shaft disposed inside the roller tube, and rotatably coupled to the belt conveyor. A dustproof cover closes one end of the roller tube, and the shaft reinforcement member extends through the dustproof cover. A bearing housing is fitted into the dustproof cover, with a bearing thereof being rotatably coupled to the outer circumference of the shaft reinforcement member. A flat spring is fitted into the bearing housing, and elastically supports one surface of the bearing, thereby controlling expansion or contraction of the bearing. An end cap is fixedly coupled to an outer surface of the dustproof cover in order to block impurities from entering the roller.

2 Claims, 4 Drawing Sheets

ROLLER FOR BELT CONVEYER

CROSS REFERENCE TO RELATED APPLICATION

The present application claims priority from Korean Patent Application Number 10-2010-0029955 filed on Apr. 1, 2010, the entire contents of which application are incorporated herein for all purposes by this reference.

BACKGROUND OF THE INVENTION

1. Field of the Invention

The present invention relates to a roller for a belt conveyer, which is intended to transport fuel and raw materials, and more particularly, to a roller for a belt conveyer, the roller being configured such that the state of abrasion thereof can be easily inspected with the eyes, and being capable of preventing dust, which is produced during the operation of the roller, and rainwater from entering.

2. Description of Related Art

In general, a conveyer is a mechanical apparatus that continuously transports raw materials, mechanical components, packaged goods, or the like. The conveyer is an important transport machine that is actively used in warehouses and distribution centers following the recent trend toward the rationalization of physical distribution.

Such conveyers can be divided into various types, including a belt conveyer, a roller conveyer, a screw conveyer, a chain conveyer, and the like, one of which is selected for use depending on the application. Among them, the roller conveyer and the belt conveyer are most frequently used.

Here, the roller conveyer includes a number of rollers, which are arranged in a line such that they can freely rotate, and is used to transport the freight by arranging the rollers at an incline or rotating the rollers using gears. In contrast, the belt conveyer includes a belt wound on belt pulleys, which are disposed on both ends of a horizontal or inclined elongated frame, and a number of rollers disposed to support the belt from below, and is used to continuously transport the freight by rotating the rollers.

In the roller conveyer and the belt conveyer, the function of the roller is very important. In particular, in the case of the belt conveyer, a number of rollers are disposed on the underside of the belt conveyer in order to move the belt or prevent the belt from sagging down. The belt is moved by rotating the rollers in order to support and transport the freight or the like.

Each roller is configured such that a roller tube forms an outer shell thereof, bearing housings are welded to both ends of the roller tube, and a shaft extending through the inner center of the roller tube supports the roller. In the state in which the shaft is in contact with bearings inside the bearing housings, the roller rotates around the shaft following the rotation of the bearings.

However, there are problems in that the bearing or the like inside the roller is worn as the roller is repeatedly operated following the rotation of the bearing, impurities enter the inside of the bearing, and grease or the like leaks from the bearing housing.

In addition, rust occurs on the inside and outside of the bearing since the roller is not waterproof, and the lifespan of the roller is greatly reduced since it is impossible to inject grease after the roller has been installed.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a roller for a belt conveyer, which is intended to rotated a rubber belt of the belt conveyer, and in which a groove is engraved in the outer surface of the roller, such that a user can inspect or determine the time to replace the roller by checking the state of abrasion of the surface of the roller with the eyes.

In addition, a flat spring is provided on one end of a bearing, which expands or shrinks in response to seasonal temperature changes while the roller is being operated, in order to control the ratio of expansion or contraction of the bearing so that the roller is properly operated, thereby minimizing the frequency of the malfunction of the roller.

Furthermore, an impurity blocking member is provided on the outer surface of a dustproof cover in order to more completely protect the roller from various impurities, such as dust, water, and sand, which would otherwise enter from the outside during the operation of the belt conveyer, thereby minimizing noise and vibration and increasing the lifetime of internal components so that they can be used for a longer time.

In an aspect of the present invention, provided is a roller for a belt conveyer, which includes a plurality of rollers provided on the upper portion thereof in order to rotate a rubber belt. The roller includes a roller tube having an engraved groove therein, the groove indicating the degree to which the surface of the roller is abraded, and a shaft reinforcement member provided in one end of the roller tube. The shaft reinforcement member is connected to a shaft disposed inside the roller tube, and is rotatably coupled to the belt conveyor. A dustproof cover closes one end of the roller tube, and the shaft reinforcement member extends through the dustproof cover. A bearing housing is fitted into the dustproof cover, with a bearing thereof being rotatably coupled to the outer circumference of the shaft reinforcement member. A flat spring is fitted into the bearing housing, and elastically supports one surface of the bearing, thereby controlling expansion or contraction of the bearing. An end cap is fixedly coupled to an outer surface of the dustproof cover in order to block impurities from entering the roller.

In an embodiment of the invention, the flat spring may have an integral elastic protrusion on the outer surface thereof. The elastic protrusion is bent at a predetermined angle such that the elastic protrusion has a predetermined elastic force to control the expansion and contraction of the bearing.

In another embodiment of the invention, the roller may further include an impurity blocking member between an auxiliary protrusion of the dustproof cover and the inner surface of the end cap. The impurity blocking member prevents minute external impurities from entering the roller.

According to embodiments of the invention, the user can inspect or determine the time to replace the roller since he/she can easily check the state of abrasion of the surface of the roller with the eyes. There is also an effect of preventing the roller, which is in contact with the rubber belt of the belt conveyer, from spinning idly.

In addition, the roller can be properly operated, since the ratio of expansion or contraction of the bearing in response to seasonal temperature changes is controlled during the operation of the roller.

Furthermore, the roller is completely protected from various impurities, such as dust, water, and sand, which would otherwise enter the inside of the roller during the operation of the belt conveyer, thereby increasing the lifetime of internal components so that they can be used for a longer time.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
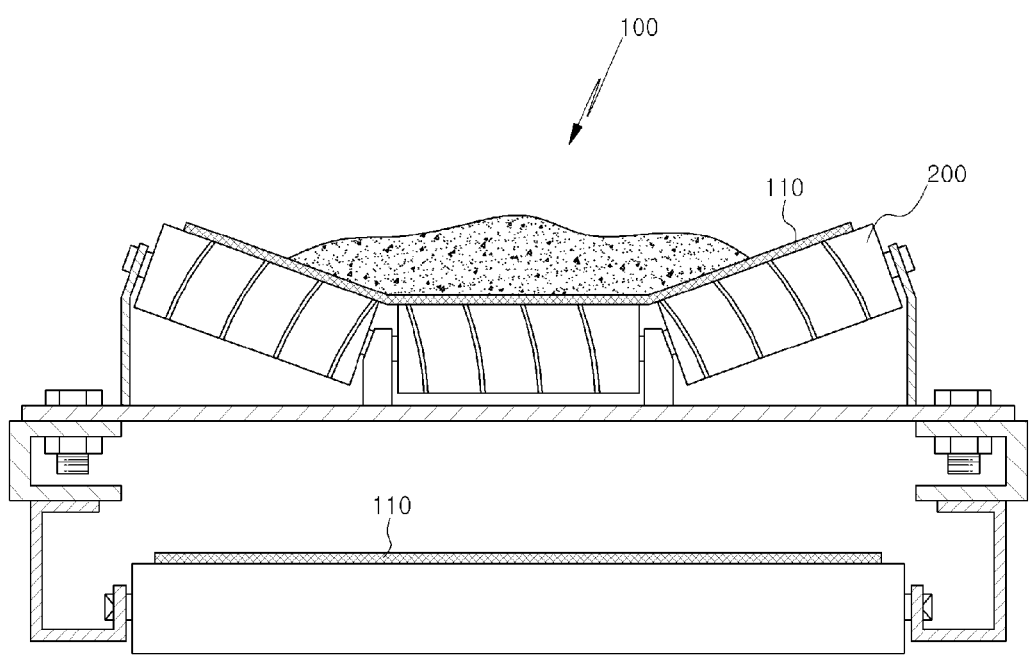
FIG. 1 is a view showing a configuration in which rollers for a belt conveyer according to an exemplary embodiment of the invention are installed.

Reference will now be made in detail to various embodiments of the present invention, examples of which are illustrated in the accompanying drawings and described below. While the invention will be described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims. Above all, reference should be made to the drawings, in which the same reference numerals and signs are used throughout the different drawings to designate the same or similar components. In the following description of the present invention, detailed descriptions of known functions and components incorporated herein will be omitted when it may make the subject matter of the present invention rather unclear.

Figure 2:
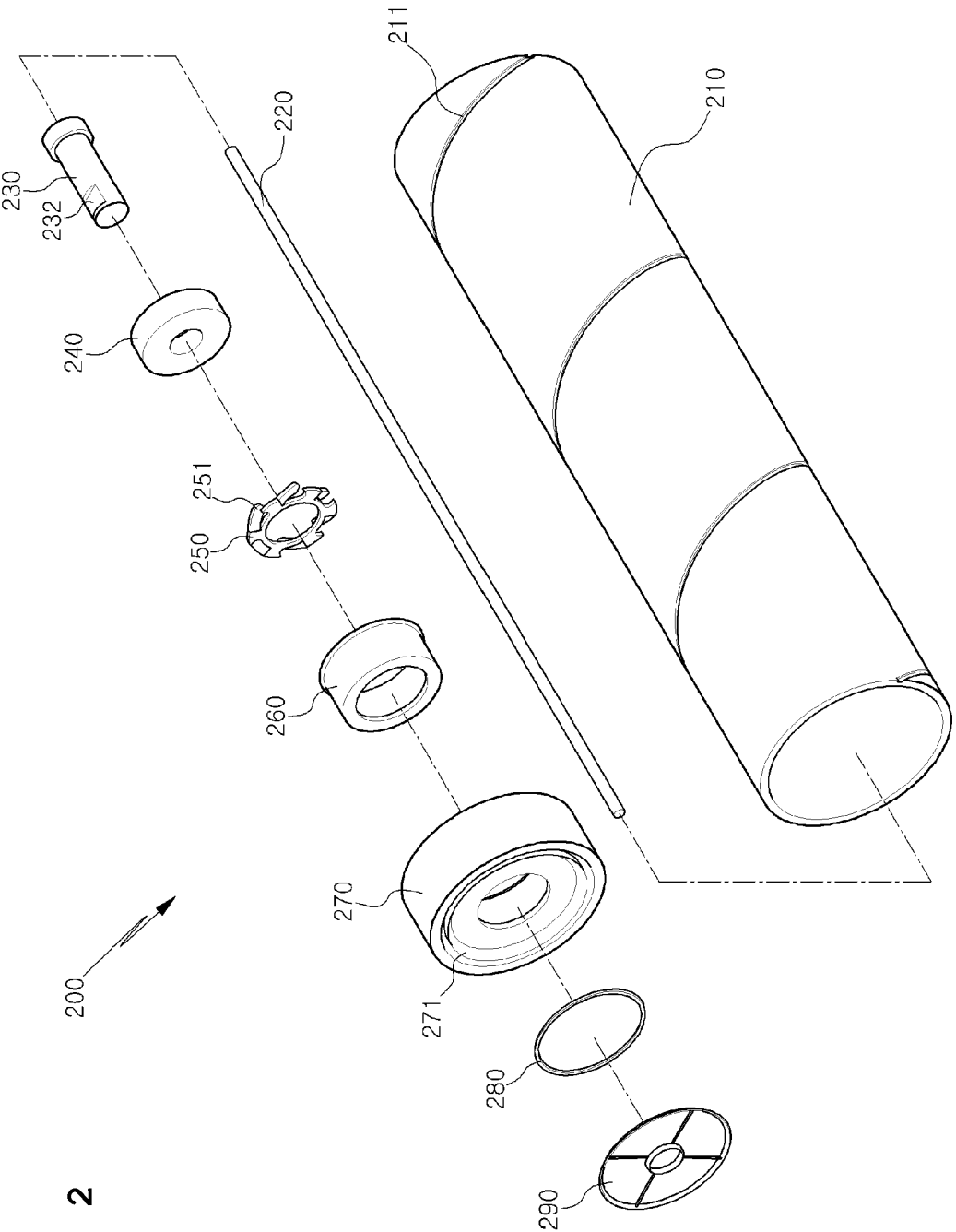
FIG. 2 is an exploded perspective view showing a roller for a belt conveyer according to an exemplary embodiment of the invention.
Figure 3:
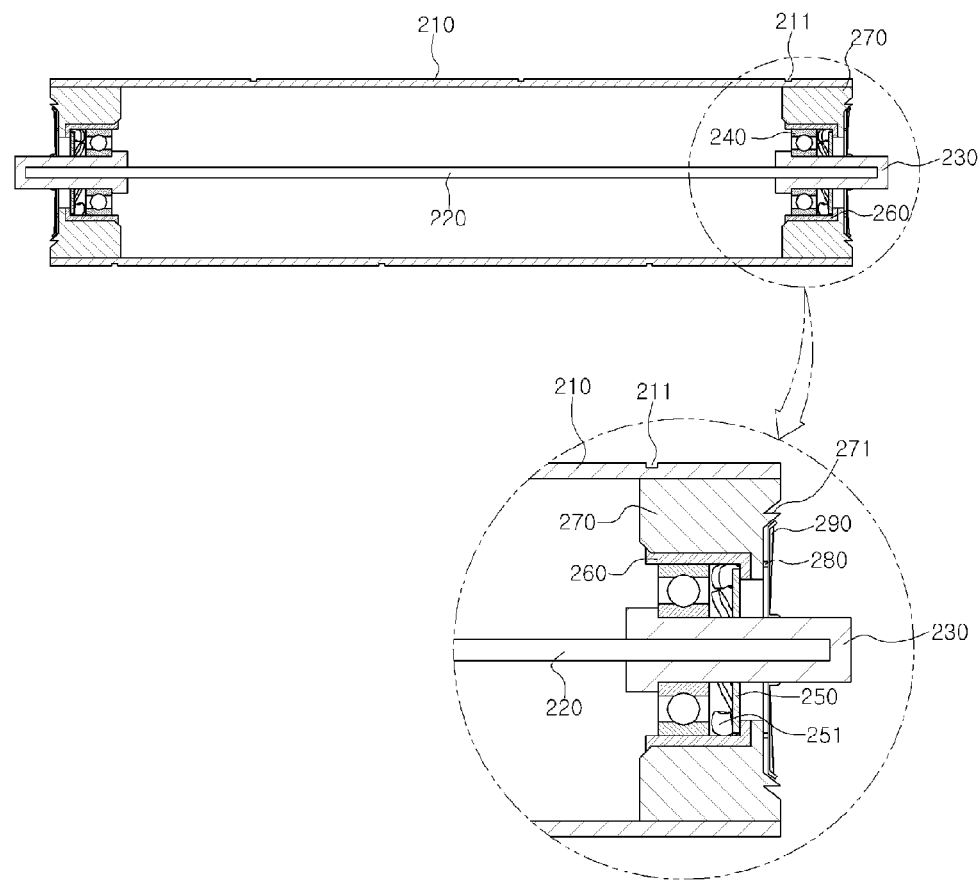
FIG. 3 is a cross-sectional view showing the roller for a belt conveyer according to an exemplary embodiment of the invention.
Figure 4:
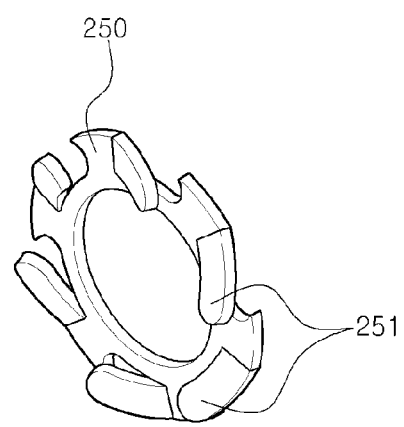
FIG. 4 is a perspective view showing the flat spring in the roller for a belt conveyer according to an exemplary embodiment of the invention.
Figure 5:
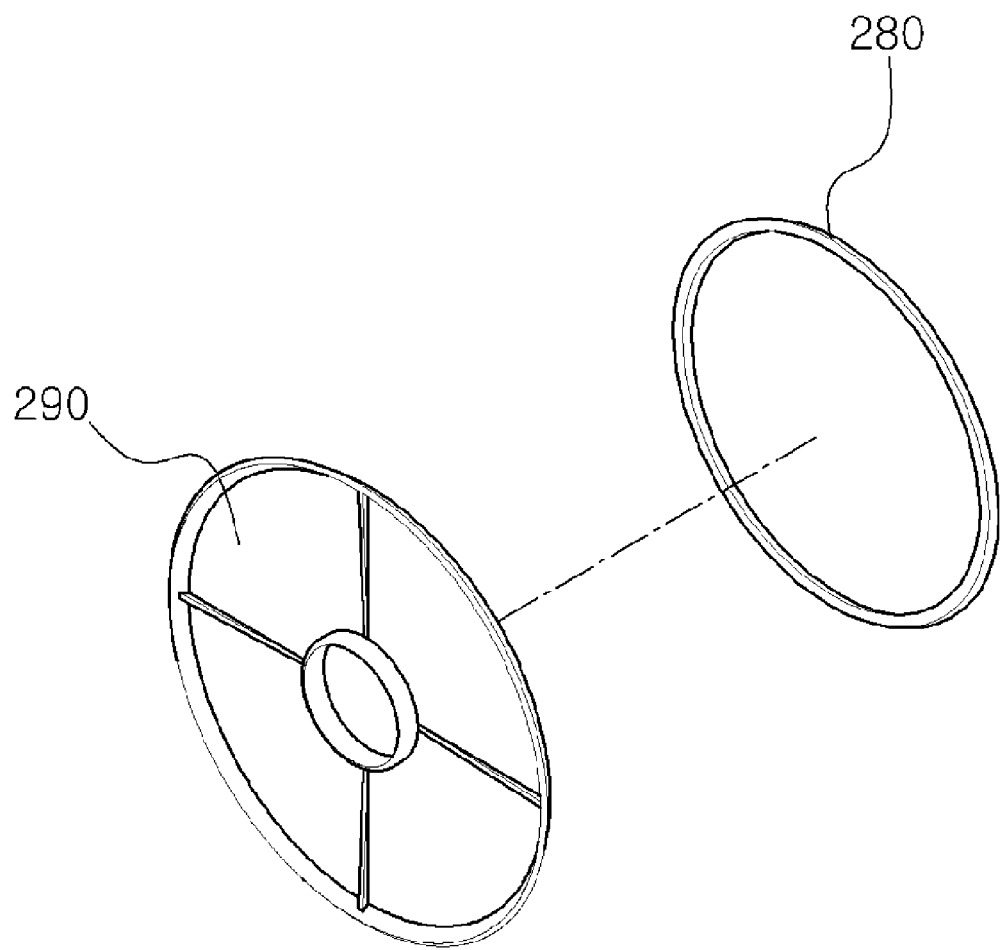
FIG. 5 is a perspective view showing the cover and the blocking member in the roller for a belt conveyer according to an exemplary embodiment of the invention.

FIG. 1 is a view showing a configuration in which rollers for a belt conveyer according to an exemplary embodiment of the invention are installed, FIG. 2 is an exploded perspective view showing a roller for a belt conveyer according to an exemplary embodiment of the invention, FIG. 3 is a cross-sectional view showing the roller for a belt conveyer according to an exemplary embodiment of the invention, FIG. 4 is a perspective view showing a flat spring in the roller for a belt conveyer according to an exemplary embodiment of the invention, and FIG. 5 is a perspective view showing a cover and a blocking member in the roller for a belt conveyer according to an exemplary embodiment of the invention.

As shown in the figures, according to the present invention, a plurality of rollers 200 is rotatably provided on the upper portion of a belt conveyer 100, such that the rollers 200 can rotate a rubber belt 110, which extends along the length of the belt conveyer in order to transport various objects.

Here, each roller 200 includes a roller tube 210, shaft reinforcement members 230, bearing housings 260, dustproof covers 270, and end caps 290. The roller tube 210 is intended to come into contact with the rubber belt 110, and has defined a groove 211 engraved in the outer circumference thereof. The groove 211 serves to indicate the degree to which the surface of the roller 200 is abraded. Each shaft reinforcement member 230 fixedly couples a shaft 220, which rotates the roller 200, to the belt conveyer 100. Each bearing housing 260 contains therein a bearing 240, which supports the rotating force of the shaft 220. Each dustproof cover 270 contains a corresponding bearing housing 260 in the inner surface thereof, and is coupled to each end of the roller tube 210 in order to block impurities from the outside. Each end cap 290 is coupled to a corresponding dustproof cover 270.

The roller tube 210 is fabricated by injection molding using a resin material such that it is shaped as a tube having a predetermined thickness. The groove 211 is engraved in the outer circumference of the roller tube 210 such that a user can inspect or determine the time to replace the roller 200 by checking the state of abrasion of the surface of the roller 200 with the eyes.

Here, the groove 211 engraved in the outer circumference of the roller tube 210 prevents the rubber belt 110 from spinning idly on the roller 200 because of the slippery surface of the roller 200.

Specifically, the groove 211 is engraved in the circumference of the roller tube 210 by carrying out screw machining or the like on the outer circumference of the roller tube 210 such that the state of abrasion of the surface of the roller tube 210, which is in contact with the rubber belt 110, can be easily inspected.

The dustproof covers 270 are disposed on both ends of the roller tube 210, and serve to close the inside of the roller tube 210 in order to prevent various impurities, such as rainwater, from entering the roller tube 210.

Each dustproof cover 270 has an auxiliary protrusion 271, which protrudes out in order to prevent impurities, such as rainwater, from entering through a gap between the dustproof cover 270 and the shaft reinforcement member 230, which extends through the dustproof cover 270.

The bearing housing 260 is made of a resin material similar to that of the roller tube 210. The resin material can be used for a long time since its resistance to wear and chemicals is better than that of a steel material, and can greatly reduce the weight of the roller 200.

The bearing housing 260 is rotatably coupled to the shaft reinforcement member 230, which will be described later, and contains therein the bearing 240. The bearing 240 serves to support the weight of the shaft 220, which supports the rotation of the roller 200, while allowing the shaft 220 to smoothly rotate. The bearing housing 260 is fitted into the inner circumference of the dustproof cover 270, and is bonded to the dustproof cover 270 by adhesion, welding, or the like.

In the meantime, the rotational force of the bearing 240 is reduced due to an increase in temperature and a deformation in shape as the roller 200 is continuously operated, and the bearing 240 is worn due to frequent operation thereof. In order to prevent this, grease is injected around the bearing 240.

A flat spring 250 is disposed inside the bearing housing 260 such that it is positioned behind the bearing 240, with a plurality of elastic protrusions 251 being formed on the outer circumference thereof in order to impart an elastic force to the bearing 240.

Here, the elastic protrusions 251 formed on the flat spring 250 serve to control, for example, the ratio of expansion or contraction of the bearing 240, which expands or shrinks in response to the force of friction that is generated by seasonal temperature changes or high speed rotation of the roller 200 during the rotation of the roller 200. The elastic protrusions 251 are formed integrally with the flat spring 250. In particular, the elastic protrusions 251 are bent at a predetermined angle such that they have a predetermined elastic force, and are in contact with the outer circumference of the bearing 240.

Since the elastic protrusions 251 of this embodiment stay in contact with the bearing 240 while maintaining a predetermined elastic force, they reduce the force of expansion of the bearing 240 due to their elastic force when the bearings 240 expand, and support the bearing 240 due to their elastic force when the bearing 240 shrinks. In this fashion, the shaft reinforce member 230, which is rotatably coupled to the bearing 240, can be smoothly rotated.

The shaft reinforcement members 230 are provided on both ends of the roller 200 such that they can reduce the overall weight of the roller 200 by minimizing the weight of the shaft 220 and support the rotational force of the roller 200. Each shaft reinforcement member 230 is rotatably coupled to the bearing 240, and has a fitting portion 232 in the outer circumference thereof, the fitting portion 232 being detachably fixed to the belt conveyer 100. One end of the shaft 220 is fitted into the inner circumference of the shaft reinforcement member 230.

Specifically, the shaft reinforcement members 230 are provided in both ends of the roller 200 such that the roller 200 can rotate, and are rotatably coupled to the bearings 240 and the conveyer. The shaft reinforcement members 230 in the both ends of the roller 200 are connected to each other by the shaft 220 such that the roller 200 can easily rotate.

This, as a result, makes it possible to fabricate the shaft 220, which is provided for the rotation of the roller 200, such that the outer diameter of the shaft 220 is smaller than that of the shaft of the related art, thereby reducing the weight of the roller.

In an example, the shaft of the related art has to be fabricated at an outer diameter of ϕ24 such that the roller can be rotated. In contrast, in this embodiment, the roller 200 can smoothly rotate even if the shaft 220, which connects the shaft reinforcement members 230 to each other, is fabricated at an outer diameter of ϕ12. Therefore, the weight of the roller 200 can be minimized.

The end cap 290 prevents impurities, such as dust and water, from entering the bearing 240 during the operation of the belt conveyer 100, thereby increasing the lifespan of internal components of the roller 200 so that they can be used for a longer time.

As above, the end cap 290 is fixedly coupled to the auxiliary protrusion 271 on the dustproof cover 270, and cooperates with the auxiliary protrusion 271 to block various external impurities from entering the roller 200.

In addition, an impurity blocking member 280 is attached between the end cap 290 and the dustproof cover 270 in order to block minute impurities such as fine dust from entering through a minute gap between the end cap 290 and the auxiliary protrusion 271.

Here, the impurity blocking member 280 is made of an elastic resin material such as spongy for the following reasons: When the roller 200 rotates, components positioned inside the roller 200 are caused to slightly move. The impurity blocking member 280, which is attached between the dustproof cover 270 and the end cap 290 attached thereto inside the roller 200, prevents external impurities from entering irrespective of the movement of the roller 200, and serves as a shock absorber between the dustproof cover 270 and the end cap 290.

The foregoing descriptions of specific exemplary embodiments of the present invention have been presented for the purposes of illustration and description. It is to be appreciated that those skilled in the art can make substitutions, or change or modify the embodiments into various forms without departing from the scope and spirit of the present invention. Accordingly, the foregoing embodiments should be regarded as illustrative rather than limiting. The scope of the present invention is not defined by the detailed description as set forth above but by the accompanying claims of the invention. It should also be understood that all alterations or modifications derived from the definitions and scopes of the claims and their equivalents fall within the scope of the invention.

What is claimed is:

1. A roller for a belt conveyer, which includes a plurality of rollers provided on an upper portion thereof in order to rotate a rubber belt, the roller comprising:
   a roller tube having an engraved groove therein, the groove indicating a degree to which a surface of the roller is abraded;
   a shaft reinforcement member provided in one end of the roller tube, wherein the shaft reinforcement member is connected to a shaft disposed inside the roller tube, and is rotatably coupled to the belt conveyor;
   a dustproof cover closing one end of the roller tube, wherein the shaft reinforcement member extends through the dustproof cover;
   a bearing housing fitted into the dustproof cover, with a bearing thereof being rotatably coupled to an outer circumference of the shaft reinforcement member;
   a flat spring fitted into the bearing housing, wherein the flat spring elastically supports one surface of the bearing, thereby controlling expansion or contraction of the bearing; and
   an end cap fixedly coupled to an outer surface of the dustproof cover in order to block impurities from entering the roller,
   wherein the flat spring has an integral elastic protrusion on an outer surface thereof, the elastic protrusion being bent at a predetermined angle such that the elastic protrusion has a predetermined elastic force to control expansion and contraction of the bearing.

2. The roller of claim 1, further comprising an impurity blocking member between an auxiliary protrusion of the dustproof cover and an inner surface of the end cap, wherein the impurity blocking member prevents minute external impurities from entering the roller.

* * * * *